(12) United States Patent
Bridgen et al.

(10) Patent No.: US 9,881,101 B2
(45) Date of Patent: Jan. 30, 2018

(54) DYNAMIC FILE RETRIEVING FOR WEB PAGE LOADING

(71) Applicant: International Business Machines Corporation, Armonk, NY (US)

(72) Inventors: Anna Bridgen, Winchester (GB); Andrew Flatt, Alton (GB); Jonathan C. Mace, Providence, RI (US); Richard W. Pilot, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 13/679,103

(22) Filed: Nov. 16, 2012

(65) Prior Publication Data

US 2014/0143649 A1    May 22, 2014

(51) Int. Cl.
G06F 17/30    (2006.01)

(52) U.S. Cl.
CPC ............... *G06F 17/30902* (2013.01)

(58) Field of Classification Search
CPC ............. G06F 17/2247; G06F 17/24; G06F 17/30876; G06F 17/30899; G06F 17/30902; H04L 67/2842
USPC ........................................................ 714/234
See application file for complete search history.

(56) References Cited

U.S. PATENT DOCUMENTS

| | | |
|---|---|---|
| 6,026,413 A | 2/2000 | Challenger et al. |
| 6,178,461 B1 | 1/2001 | Chan et al. |
| 6,622,168 B1 | 9/2003 | Datta |
| 7,082,454 B1 | 7/2006 | Gheith |
| 8,332,763 B2 | 12/2012 | Zhang et al. |
| 9,563,325 B2 | 2/2017 | Chakra et al. |
| 2002/0116583 A1* | 8/2002 | Copeland .......... G06F 17/30902 711/133 |
| 2002/0156980 A1* | 10/2002 | Rodriguez ............ G06F 12/121 711/136 |
| 2004/0133854 A1 | 7/2004 | Black |
| 2008/0104256 A1 | 5/2008 | Olston |
| 2009/0024982 A1 | 1/2009 | Diep et al. |
| 2010/0161717 A1* | 6/2010 | Albrecht et al. .............. 709/203 |
| 2010/0174861 A1* | 7/2010 | Katz et al. .................... 711/113 |
| 2010/0332513 A1* | 12/2010 | Azar et al. .................... 707/769 |
| 2011/0029641 A1 | 2/2011 | Fainberg et al. |
| 2011/0289533 A1* | 11/2011 | White ................. G06F 17/3002 725/46 |
| 2011/0302524 A1 | 12/2011 | Forstall |
| 2012/0079057 A1* | 3/2012 | Fainberg et al. ............ 709/214 |
| 2012/0297291 A1* | 11/2012 | Fainberg et al. ............ 715/234 |

(Continued)

FOREIGN PATENT DOCUMENTS

EP    1564661 A2    8/2005

OTHER PUBLICATIONS

PONS; "Semantic Prefetching Objects of Slower Web Site Pages"; ScienceDirect,The Journal of Systems and Software 79; 2006; pp. 1715-1724. Copyright 2006 Elsevier Inc.

*Primary Examiner* — Wilson Tsui

(74) *Attorney, Agent, or Firm* — Michael O'Keefe

(57) ABSTRACT

A computer loads a web page, the web page including a first file and a second file. The computer then determines a likelihood of change value for the first and second file. The computer then loads one of the first or second file having a higher likelihood of change value and subsequently loads the other of the first or second file having a lower likelihood of change value.

17 Claims, 4 Drawing Sheets

(56) References Cited

U.S. PATENT DOCUMENTS

| | | | |
|---|---|---|---|
| 2012/0303697 A1* | 11/2012 | Alstad ........................... | 709/203 |
| 2013/0067170 A1* | 3/2013 | Lam ............................. | 711/137 |
| 2013/0339469 A1* | 12/2013 | Yolleck et al. ............... | 709/213 |
| 2015/0199344 A1* | 7/2015 | Lloyd .............. | G06F 17/30011 |
| | | | 707/752 |

* cited by examiner

DYNAMIC FILE RETRIEVING FOR WEB PAGE LOADING

FIELD OF THE INVENTION

The present invention relates generally to web browsing, and more particularly to creating a sequence for updating web page files based on the likelihood of change of the web page files.

BACKGROUND

As the internet becomes a larger and larger part of our lives, the demand for faster web surfing continues to grow. Internet service providers continue to increase the download/upload speeds offered to help appease this demand, however, as connection speeds increase, web page sizes do as well. One way modern web browsers speed up the web page loading process is to store a copy of the web page in local cache. When a user clicks on a web page, instead of loading the entire web page from a server, the browser initially loads a cached copy of the web page from its local memory. The cached copy is then updated until it matches the current version of the webpage. Since loading a file from local memory is much faster than retrieving a file via a network from a server, loading a cached copy of a web page is significantly faster than retrieving a web page from a server. The cached copy then serves as a base for the web page, resulting in less data needing to be retrieved from the server.

SUMMARY

Embodiments of the present invention provide a system, method, and program product for creating a sequence for updating web page files and cache based on the likelihood of change of the web page files. A computer loads a web page, the web page including a first file and a second file. The computer then determines a likelihood of change value for the first and second file. The computer then loads one of the first or second file having a higher likelihood of change value and subsequently loads the other of the first or second file having a lower likelihood of change value.

DETAILED DESCRIPTION

Figure 1:
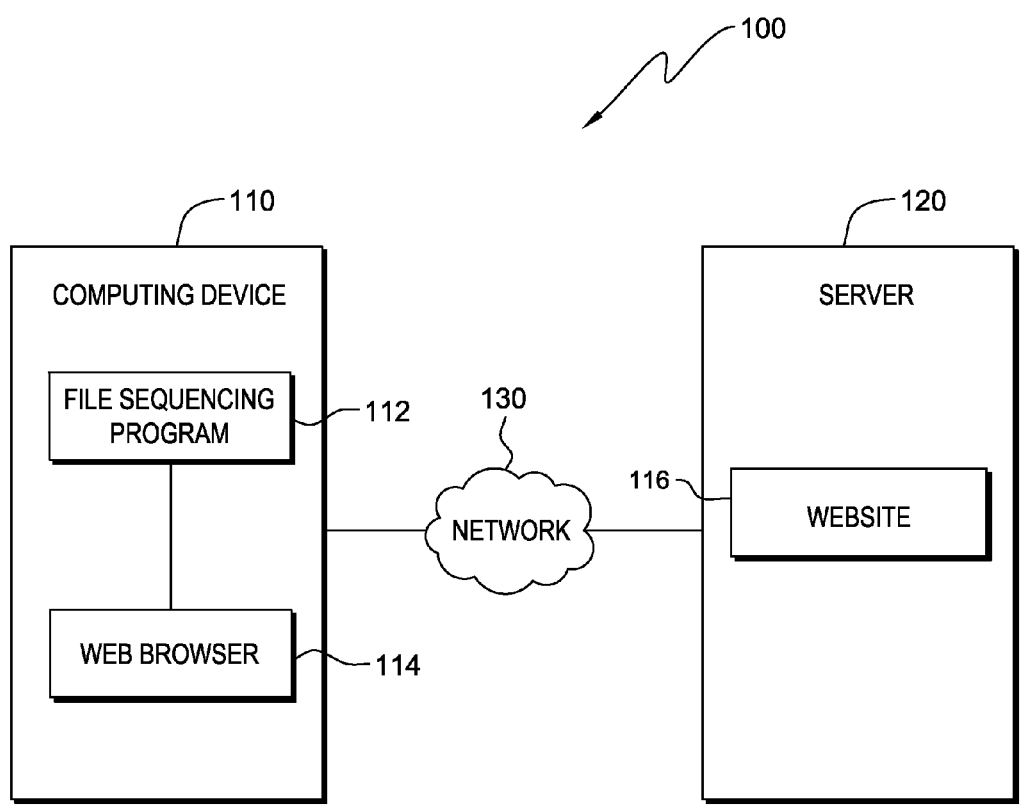
FIG. 1 illustrates a dynamic file retrieving system, in accordance with an embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Embodiments of the present invention will now be described in detail with reference to the accompanying Figures.

FIG. 1 illustrates dynamic file retrieving system 100, in accordance with an embodiment of the invention. Dynamic file retrieving system 100 includes computing device 110 and server 120, interconnected over network 130.

In an exemplary embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between computing device 110 and server 120.

Server 120 includes website 116. Although not shown, optionally, server 120 can comprise a cluster of web servers executing the same or similar software to collectively process the requests for the web pages as distributed by a front end server and a load balancer. Server 120 may be a desktop computer, a notebook, a laptop computer, a tablet computer, a handheld device, a smart-phone, a thin client, or any other electronic device or computing system capable of receiving and sending data to and from computing device 110 via network 130. In an exemplary embodiment, server 120 is a computing device that is optimized for the support of websites which reside on the server, such as website 116, and for the support of network requests related to websites which reside on the server. Server 120 is described in more detail with reference to FIG. 4.

Website 116 is a collection of files including, for example, hypertext markup language (HTML) files, cascading style sheet (CSS) files, image files, and JavaScript files.

Computing device 110 includes file sequencing program 112 and web browser 114. Computing device 110 may be a desktop computer, a notebook, a laptop computer, a tablet computer, a handheld device, a smart-phone, a thin client, or any other electronic device or computing system capable of receiving and sending data to and from server 120 via network 130. Computing device 110 is described in more detail with reference to FIG. 4.

Web browser 114 is a program that enables users to view, watch, or listen to documents and other resources, such as audio and video files, retrieved from a network device. In an exemplary embodiment, web browser 114 requests documents and other resources, identified by their uniform resource locator (URL), from server 120 via network 130. Web browser 114 transmits requests to server 120 for documents and/or resources contained in website 116. Server 120 responds to the requests by retrieving the documents and resources from website 116, and transmitting them back to web browser 114 via network 130. In an exemplary embodiment, documents and resources retrieved by web browser 114 are viewed by a user of computing device 110 on a display device. In general, web browser 114 can be any browser application capable of execution on a computing device, and capable of supporting file sequencing program 112.

File sequencing program 112 is a program that calculates a likelihood of change value for each file of website 116 and based on the calculated likelihood of change value, creates a loading sequence for the files of the website requested by web browser 114. In an exemplary embodiment, file sequencing program 112 calculates the likelihood of change value of a website 116 file based on local observation of the website file via web browser 114. File sequencing program 112 then loads each of the requested files in a sequence based on the likelihood of change value of each requested file. While file sequencing program 112 is shown as a partially integrated with web browser 114, in other embodiments, the file sequencing program can be fully integrated with the web browser or a completely separate component. The process of calculating the likelihood of change value of each file of website 116 and determining the sequence of requested files of the website to be loaded is described in further detail with regard to FIGS. 2 and 3.

Figure 2:
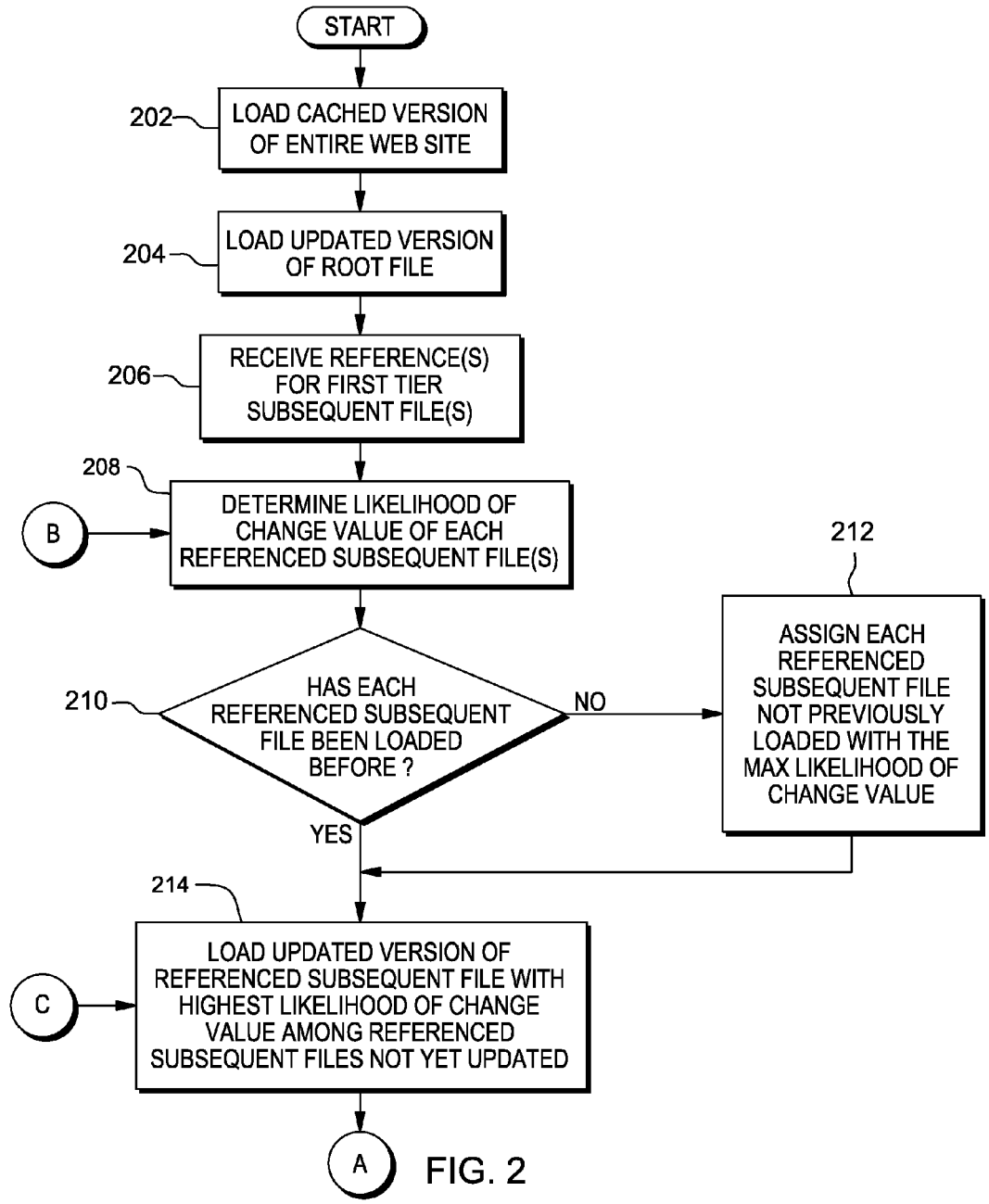
FIGS. 2 and 3 are a flowchart illustrating the operations of the file sequencing program of FIG. 1, in accordance with an embodiment of the invention.
Figure 3:
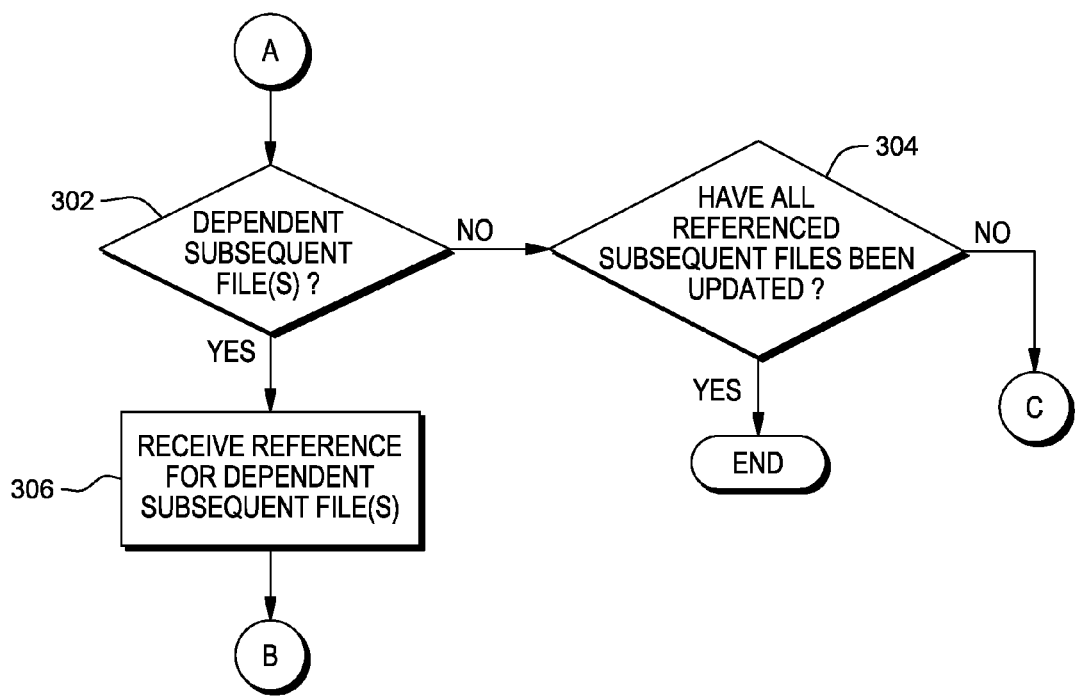

FIGS. 2 and 3 show a flowchart illustrating the operations of file sequencing program 112 in creating a loading sequence for files referenced when website 116 is loaded by web browser 114, based on the likelihood of change value of each referenced file, in accordance with an exemplary embodiment of the invention. In an exemplary embodiment, file sequencing program 112 residing on computing device 110 is invoked when a cached version of website 116 is loaded by web browser 114 (step 202). In the exemplary embodiment, the cached version of website 116 is displayed in web browser 114. In another embodiment, file sequencing program 112 is invoked when the operating system of computing device 110 is launched or initiated.

File sequencing program 112 then loads an updated version of the root file of website 116 for display in web browser 114 (step 204). In the exemplary embodiment, when loaded, the updated version of the root file of website 116 is displayed in web browser 114, replacing the previous version of the root file. A root file is similar to a template for the website and is typically in "index.html" format. A root file can contain the majority of the website content including images and text, or it can contain almost no content. The exact content of a root file is at the discretion of the web developer. Therefore, when the updated version of the root file of website 116 is loaded and displayed in web browser 114 in place of the previous version of the root file, the changes and updates may or may not be visible to the user of computing device 110. In other embodiments, file sequencing program 112 instructs web browser 114 to load the updated version of the root file of website 116.

File sequencing program 112 then receives references for first tier subsequent files from website 116 via network 130 (step 206). The referenced first tier subsequent files are files dependent on the updated root file of website 116. These first tier subsequent files are the various file types that compose website 116, such as JavaScript files, HTML files, or image files.

File sequencing program 112 then determines the likelihood of change value of each subsequent file referenced by website 116 (step 208). In the exemplary embodiment, the likelihood of change value of each subsequent file referenced by website 116 is determined based on local observation of each subsequent file via web browser 114. In the exemplary embodiment, file sequencing program 112 determines the likelihood of change value of each subsequent file referenced by website 116 by calculating the ratio of the number of days where the referenced file has changed to the total number of days in the observation time period. For example, if a file is observed via web browser 114, on day 1, day 5, day 7 and day 10; and the file is observed to have changed on day 5 and day 10. The likelihood of change value of the file is 2 (the number of days where the referenced file has changed) divided by 10 (the total number of days in the observation time period), which equals 0.2 or 20%. In the exemplary embodiment, the magnitude of the change is not taken into account by file sequencing program 112. File sequencing program 112 only determines if a change in the file occurs, not the magnitude of the change. In addition, in the exemplary embodiment, when determining the number of days where the referenced file has changed, file sequencing program 112 only determines whether a file changes or not (from the last version of the file) on a given day. If the file changes once or more than once on a given day, file sequencing program 112 treats both situations equivalently. In an alternate embodiment, file sequencing program 112 determines the likelihood of change value of a referenced file by calculating the ratio of the number of times the file changes to the number of days the file is observed by web browser 114. In this alternate embodiment, file sequencing program 112 takes into account whether or not the file changes more than once on a given day.

In another embodiment, the likelihood of change value of each subsequent file referenced by website 116 can be determined by web server 120 which hosts website 116. In this embodiment, file sequencing program 112 receives the likelihood of change value of each subsequent file from web server 120 via network 130. In other embodiments, the likelihood of change value of each subsequent file referenced by website 116 can be determined by an online web crawler such as Google™, which typically performs similar website likelihood of change calculations when web crawling or spidering. At this point in the process, file sequencing program 112 has only received references for the first tier subsequent files, i.e., the files directly referenced by the root file of website 116, therefore, the file sequencing program determines the likelihood of change value for each of the first tier subsequent files.

File sequencing program 112 then determines if each referenced subsequent file has been previously loaded by computing device 110 (decision 210). If file sequencing program 112 determines that a referenced subsequent file has not been previously loaded by computing device 110 (decision 210, "NO" branch), the file sequencing program assigns the maximum likelihood of change value, i.e., 1, to the referenced subsequent file (step 212). If a referenced subsequent file has not been previously loaded by computing device 110, then no cached version of the file is saved in local memory of the computing device for file sequencing program 112 to retrieve when a cached version of website 116 is loaded. By assigning the maximum likelihood of change value to the referenced subsequent file, file sequencing program 112 assures that the referenced subsequent file is loaded prior to updated versions of other referenced subsequent files for which a cache version is available in local memory. Once file sequencing program 112 has assigned the maximum likelihood of change value to the referenced subsequent file that has not been previously loaded by computing device 110 (step 212) or if file sequencing program 112 determines that each referenced subsequent file has been previously loaded by the computing device (decision 210, "YES" branch), the file sequencing program moves on to the next step (step 214).

File sequencing program 112 then loads an updated version of the referenced subsequent file with the highest likelihood of change value among referenced subsequent files not yet updated (step 214). In the exemplary embodiment, when loaded, the updated version of the referenced subsequent file is displayed in web browser 114, replacing the previous version of the referenced subsequent file, if a previous version exists. In the exemplary embodiment, to accomplish this step, file sequencing program 112 analyzes the determined likelihood of change values for each referenced subsequent file. For example, if file sequencing program 112 determines a referenced subsequent file has not been previously loaded by computing device 110 (decision 210, "NO" branch), the referenced subsequent file is loaded first because it is assigned the maximum likelihood of change value. Otherwise, file sequencing program 112 loads an updated version of the referenced subsequent file with the highest likelihood of change value among the referenced subsequent files not yet updated. In the exemplary embodiment, once an updated version of a referenced subsequent file is loaded, file sequencing program 112 saves a copy of the updated version of the file in cache for future use. In other embodiments, once an updated version of a referenced subsequent file is loaded, web browser 114 saves a copy of the updated version of the file in cache for future use.

After an updated version of the referenced subsequent file with the highest likelihood of change value is loaded, file sequencing program 112 determines if the referenced subsequent file has any dependent subsequent files (decision 302, FIG. 3). A dependent subsequent file is a file that is dependent on or is referenced by a referenced subsequent file. For example, if a root file of a website references a JavaScript file (the referenced subsequent file); the JavaScript file may in turn reference an image file. The image file in this case is a dependent subsequent file of the JavaScript file. If file sequencing program 112 determines that the referenced subsequent file has a dependent subsequent file(s) (decision 302, "YES" branch), the file sequencing program receives reference for the dependent subsequent file(s) from website 116 via network 130 (step 306). File sequencing program 112 then returns back to step 208 and determines the likelihood of change value of each referenced subsequent file, including any referenced dependent subsequent files (step 208). If file sequencing program 112 determines the referenced subsequent file does not have a dependent subsequent file(s) (decision 302, "NO" branch), the file sequencing program determines if all referenced subsequent files are updated (decision 304). If file sequencing program 112 determines all referenced subsequent files are not updated (decision 304, "NO" branch), the file sequencing program returns back to step 214 and loads an updated version of the referenced subsequent file with the highest likelihood of change value among referenced subsequent files not yet updated (step 214). If file sequencing program 112 determines all referenced subsequent files are updated (decision 304, "YES" branch), then website 116 is fully up to date.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 4:
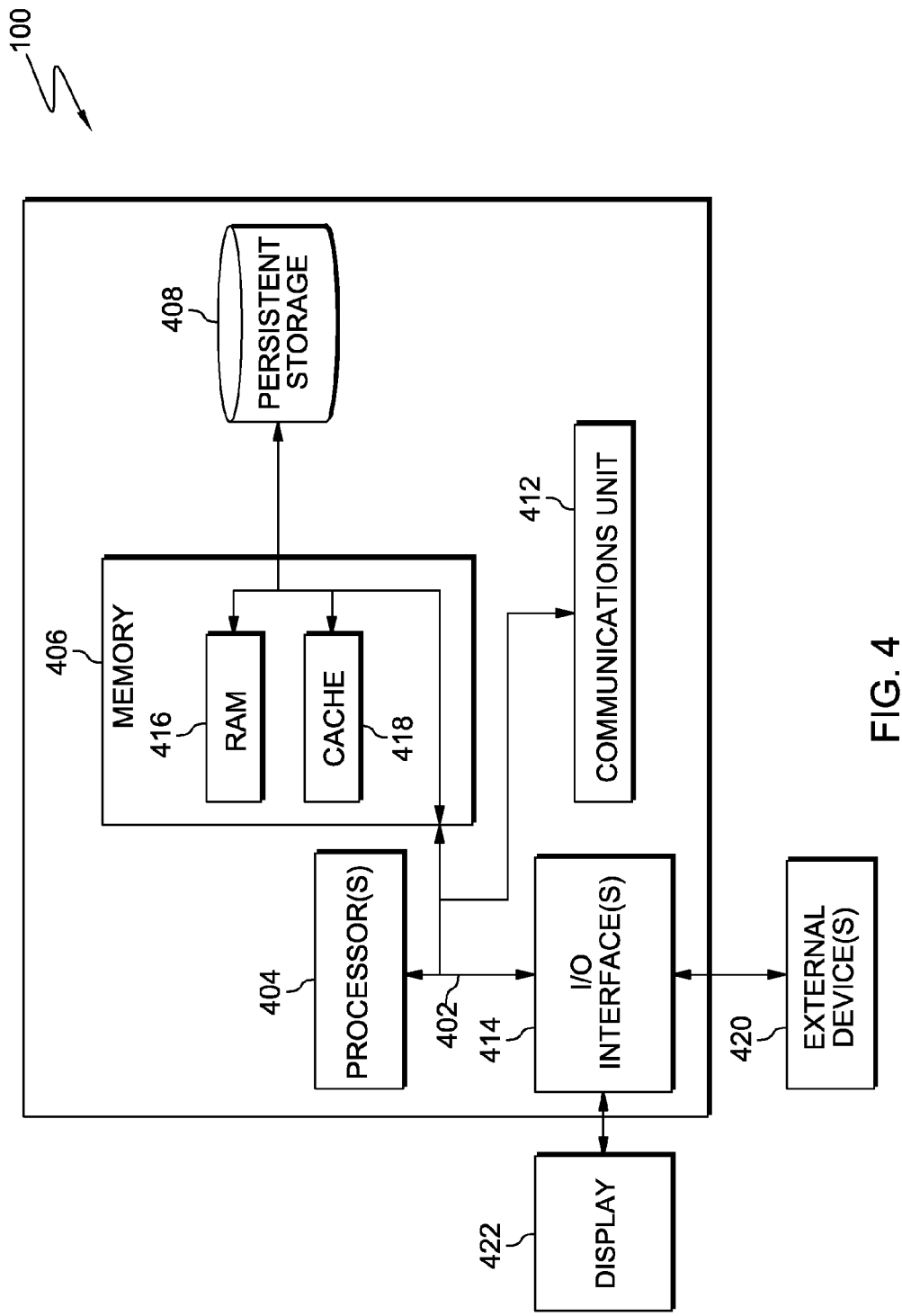
FIG. 4 is a block diagram depicting the hardware components of the dynamic file retrieving system of FIG. 1, in accordance with an embodiment of the invention.

FIG. 4 depicts a block diagram of components of computing device 110 and server 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 and server 120 include communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

The one or more operating systems and programs, file sequencing program 112 and web browser 114 in computing device 110; and the one or more operating systems and program website 116 in server 120 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. The programs file sequencing program 112 and web browser 114 in computing device 110; and program website 116 in server 120 may be downloaded to persistent storage 408 through communications unit 412.

I/O interface(s) 414 allows for input and output of data with other devices that may be connected to computing device 110 and server 120. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention, e.g., programs file sequencing program 112 and web browser 114 in computing device 110; and program website 116 in server 120, can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for dynamic web page file retrieving, comprising the steps of:
   a computer receiving a request to load a web page, wherein the web page includes a first file coupled with a likelihood of change value of the first file and a second file coupled with a likelihood of change value of the second file, wherein the likelihood of change value of the first file and the likelihood of change value of the second file are determined by observations made when the first file or the second file are loaded, wherein the determination is performed by a web crawler, and wherein a determination of change value for each first tier subsequent files is performed, and
   wherein the first file and the second file are loaded from a website and not from a cached version of the web page when there is a maximum likelihood of change value assigned to the first file and the second file, wherein the maximum likelihood of change value is a maximum value that can be obtained by a likelihood of change value of a file, and wherein the second file has not been previously loaded from the cached version of the web page;

the computer updating the likelihood of change value of the first file and the likelihood of change value of the second file, wherein the computer updating the likelihood of change value of the first file and the likelihood of change value of the second file further comprises:

based on determining the second file has not been loaded before from the cached version of the web page, assigning new values to the likelihood of change value of the first file and the likelihood of change value of the second file, wherein the likelihood of change value of the second file is assigned the maximum likelihood of change value, and wherein the likelihood of change value of the second file is higher than the assigned first file likelihood of change value;

based on determining the second file likelihood of change value is higher than the first file likelihood of change value, the computer determining whether the second file has one or more associated dependent files;

based on determining that the second file has one or more associated dependent files, the computer loading the second file and the one or more associated dependent files and subsequently loading the first file; and based on determining that the second file does not have one or more associated dependent files, the computer loading the second file and subsequently loading the first file.

2. The method of claim 1, wherein the first file likelihood of change value and the second file likelihood of change value is determined by a host of the web page.

3. The method of claim 1, wherein the first file likelihood of change value and the second file likelihood of change value is determined by an online search engine.

4. The method of claim 1, further comprising the steps of:
based on the computer determining the first file has not been loaded before, the computer assigning the first file likelihood of change value the maximum likelihood of change value; and
based on the computer determining the first file has not been loaded before, the computer assigning the likelihood of change value of the second file less than the maximum likelihood of change value.

5. The method of claim 1, further comprising the step of the computer loading the cached version of the web page.

6. The method of claim 1, further comprising the step of the computer loading a cached version of the first file.

7. The method of claim 1, further comprising the step of the computer loading a cached version of the second file.

8. A computer program product for dynamic web page file retrieving, the computer program product comprising:
one or more computer-readable storage devices and program instructions stored on at least one of the one or more computer-readable storage devices, wherein the one or more computer-readable storage devices do not include transitory signals per se, the program instructions comprising:
program instructions to load a web page, wherein the web page includes a first file coupled with a likelihood of change value of the first file and a second file coupled with a likelihood of change value of the second file, wherein the likelihood of change value of the first file and the likelihood of change value of the second file are determined by observations made when the first file or the second file are loaded, wherein the determination is performed by a web crawler, and wherein a determination of change value for each first tier subsequent files is performed, and wherein the first file and the second file are loaded from a website and not from a cached version of the web page when there is a maximum likelihood of change value assigned to the first file and the second file, wherein the maximum likelihood of change value is a maximum value that can be obtained by a likelihood of change value of a file, and wherein the second file has not been previously loaded from the cached version of the web page;

program instructions to update the likelihood of change value of the first file and the likelihood of change value of the second file, wherein the computer updating the likelihood of change value of the first file and the likelihood of change value of the second file further comprises:

based on determining the second file has not been loaded before from the cached version of the web page, program instructions to assign new values to the likelihood of change value of the first file and the likelihood of change value of the second file, wherein the likelihood of change value of the second file is assigned the maximum likelihood of change value, and wherein the likelihood of change value of the second file is higher than the assigned first file likelihood of change value;

based on determining the second file likelihood of change value is higher than the first file likelihood of change value, program instructions to determine whether the second file has one or more associated dependent files;

based on determining that the second file has one or more associated dependent files, program instructions to load the second file and the one or more associated dependent files and subsequently load the first file; and based on determining that the second does not have one or more associated dependent files, program instructions to load the second file and subsequently load the first file.

9. The computer program product of claim 8, wherein the first file likelihood of change value and the second file likelihood of change value is determined by a host of the web page.

10. The computer program product of claim 8, wherein the first file likelihood of change value and the second file likelihood of change value is determined by an online search engine.

11. The computer program product of claim 8, further comprising the steps of:
based on determining the first file has not been loaded before, program instructions to assign the first file likelihood of change value the maximum likelihood of change value; and
based on determining the first file has not been loaded before, assigning the likelihood of change value of the second file less than the maximum likelihood of change value.

12. The computer program product of claim 8, further comprising loading the cached version of the web page.

13. The computer program product of claim 8, further comprising loading a cached version of the first file.

14. The computer program product of claim 8, further comprising loading a cached version of the second file.

15. A computer system for dynamic web page file retrieving, the computer system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to load a web page, wherein the web page includes a first file coupled with a likelihood of change value of the first file and a second file coupled with a likelihood of change value of the second file, wherein the likelihood of change value of the first file and the likelihood of change value of the second file are determined by observations made when the first file or the second file are loaded and, wherein the determination is performed by a web crawler, and wherein a determination of change value for each first tier subsequent files is performed, and wherein the first file and the second file are loaded from a website and not from a cached version of the web page when there is a maximum likelihood of change value assigned to the first file and the second file, wherein the maximum likelihood of change value is a maximum value that can be obtained by a likelihood of change value of a file, and wherein the second file has not been previously loaded from the cached version of the web page;

program instructions to update the likelihood of change value of the first file and the likelihood of change value of the second file, wherein the computer updating the likelihood of change value of the first file and the likelihood of change value of the second file further comprises:

based on determining the second file has not been loaded before from the cached version of the web page, program instructions to assign new values to the likelihood of change value of the first file and the likelihood of change value of the second file, wherein the likelihood of change value of the second file is assigned the maximum likelihood of change value, and wherein the likelihood of change value of the second file is higher than the assigned first file likelihood of change value;

based on determining the second file likelihood of change value is higher than the first file likelihood of change value, program instructions to determine whether the second file has one or more associated dependent files;

based on determining that the second file has one or more associated dependent files, program instructions to load the second file and the one or more associated dependent files and subsequently load the first file; and based on determining that the second does not have one or more associated dependent files, program instructions to load the second file and subsequently load the first file.

16. The computer system of claim 15, further comprising:

based on determining the first file has not been loaded before, program instructions to assign the first file likelihood of change value the maximum likelihood of change value; and based on determining the first file has not been loaded before, assigning the likelihood of change value of the second file less than the maximum likelihood of change value.

17. The computer system of claim 15, further comprising loading the cached version of the web page.

* * * * *